United States Patent [19]
Robb

[11] Patent Number: 4,644,739
[45] Date of Patent: Feb. 24, 1987

[54] AGRICULTURAL BALER
[75] Inventor: John Robb, Sudbury, United Kingdom
[73] Assignee: Bamfords International Limited, Staffordshire, United Kingdom
[21] Appl. No.: 760,320
[22] Filed: Jul. 29, 1985

Related U.S. Application Data
[63] Continuation-in-part of Ser. No. 662,135, Oct. 18, 1984.

[30] Foreign Application Priority Data
Jul. 31, 1984 [GB] United Kingdom ............... 8419498

[51] Int. Cl.$^4$ ............................................. A01O 59/00
[52] U.S. Cl. ................................. 56/341; 100/188 R
[58] Field of Search ....................... 56/341, 344, 16.5; 100/188 R, 189

[56] References Cited
U.S. PATENT DOCUMENTS
1,496,363  6/1928  Bonnafoux .
2,909,887 10/1959  Claas et al. .
4,091,603  5/1978  Oosterling et al. .
4,172,414 10/1979  Klinner et al. .
4,184,312  1/1980  Oosterling et al. .
4,202,262  5/1980  Claas et al. .
4,240,245 12/1980  Oosterling et al. .

FOREIGN PATENT DOCUMENTS
1025996  4/1966  United Kingdom .
1042963  9/1966  United Kingdom .
1513288  6/1978  United Kingdom .
1567177  5/1980  United Kingdom .

Primary Examiner—Robert Peshock
Assistant Examiner—John G. Weiss
Attorney, Agent, or Firm—Parmelee, Miller, Welsh & Kratz

[57] ABSTRACT

An agricultural baler has a pick-up for picking up crop. The picked up crop is fed rearwardly from the pick-up into a compression chamber in which the crop is compressed into a high density bale by a compression member. The compression member is movable into the compression chamber to act on the crop and is then movable rearwardly when within the compression chamber to compress the crop against a stop to form the bale. The compression member is then movable outwardly of the compression chamber and, while disposed out of the compression chamber, is movable forwardly to return to the original position at the front of the compression chamber.

14 Claims, 19 Drawing Figures

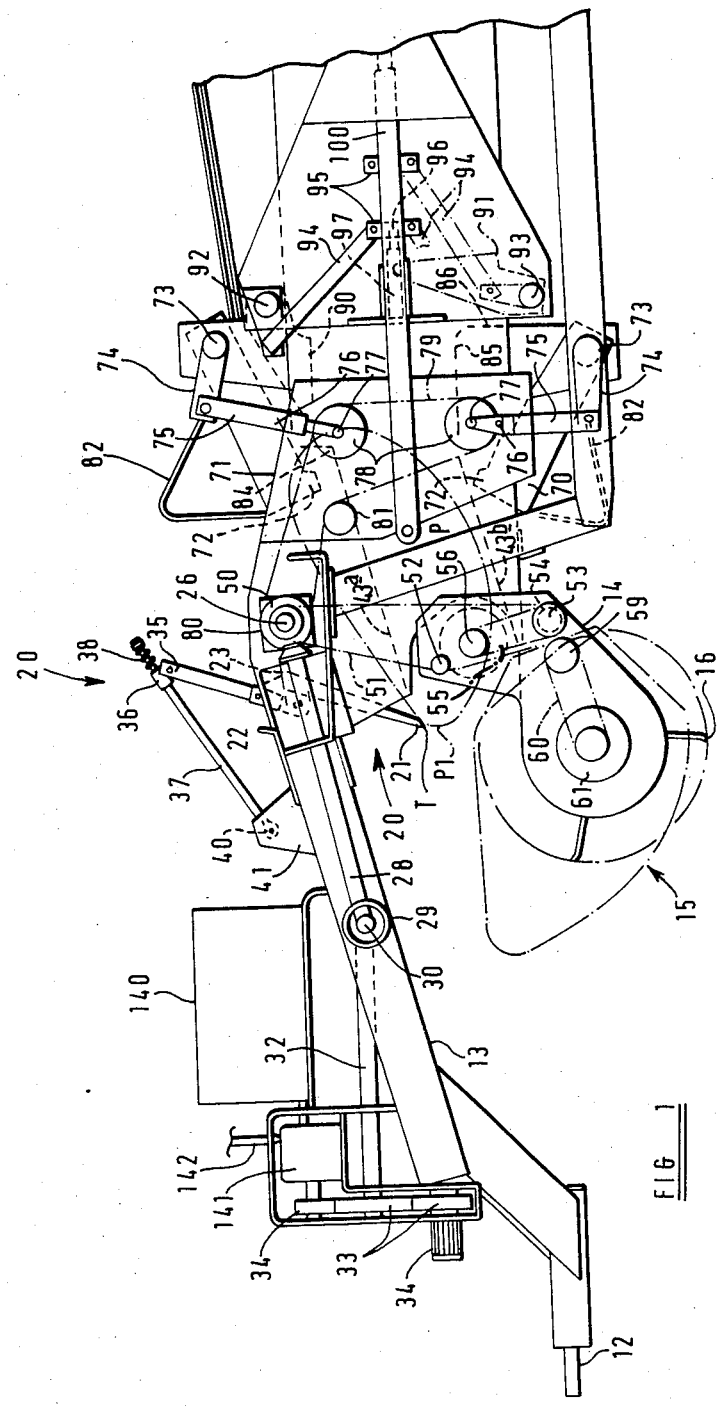

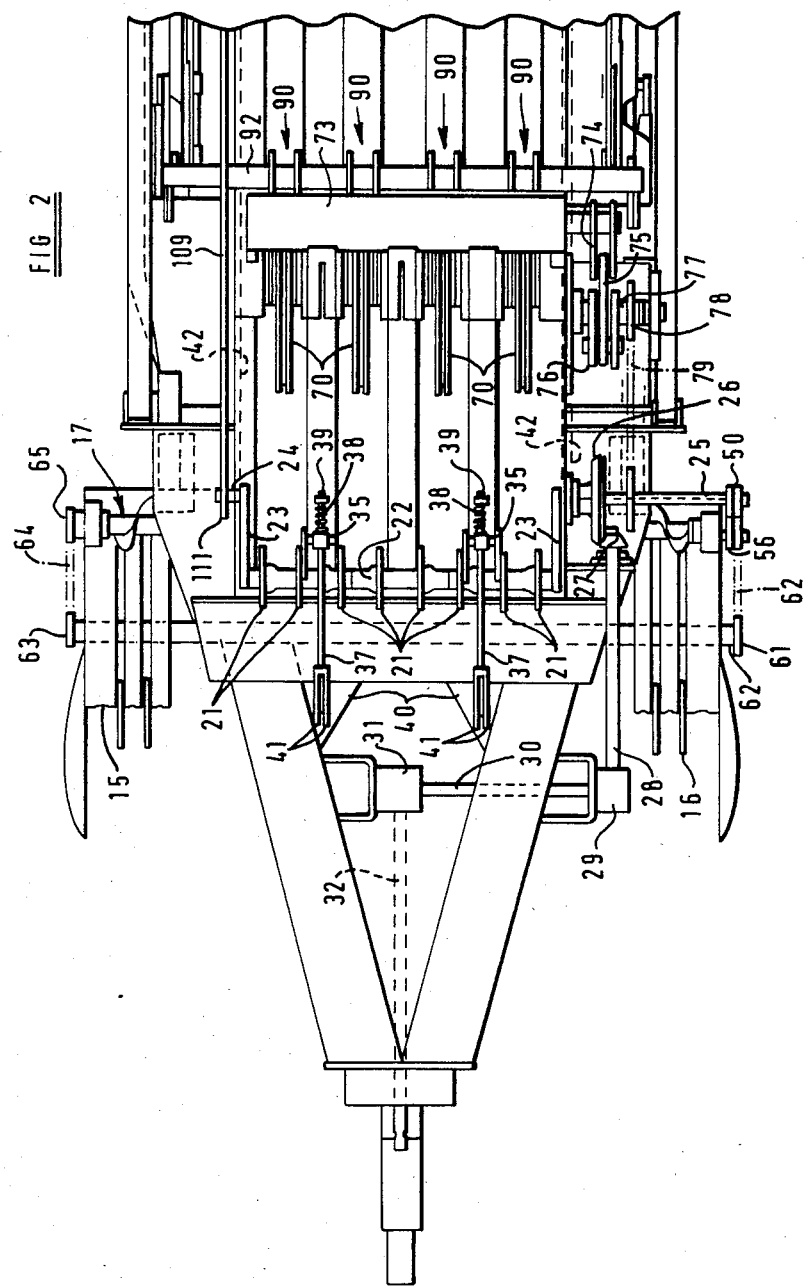

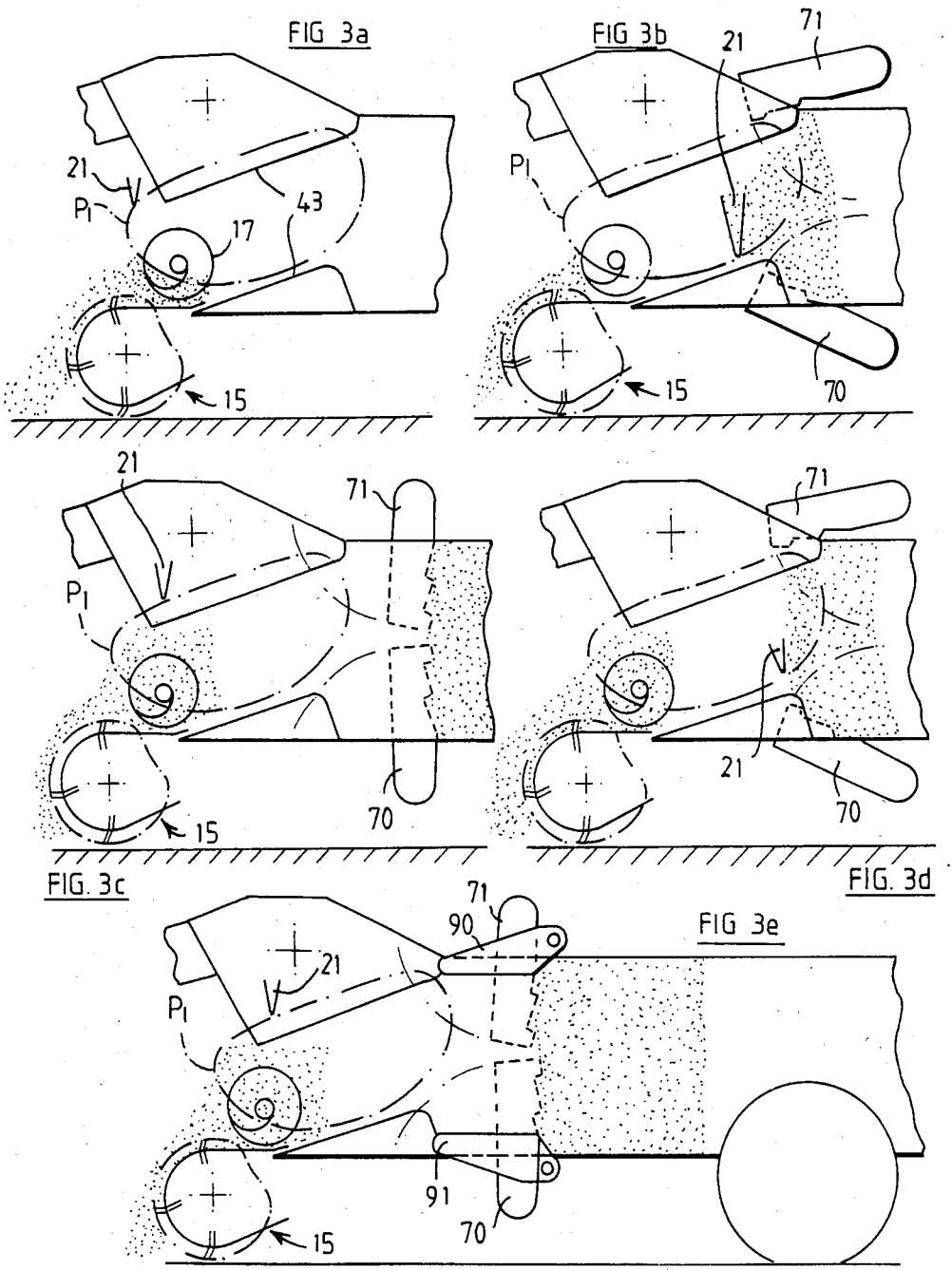

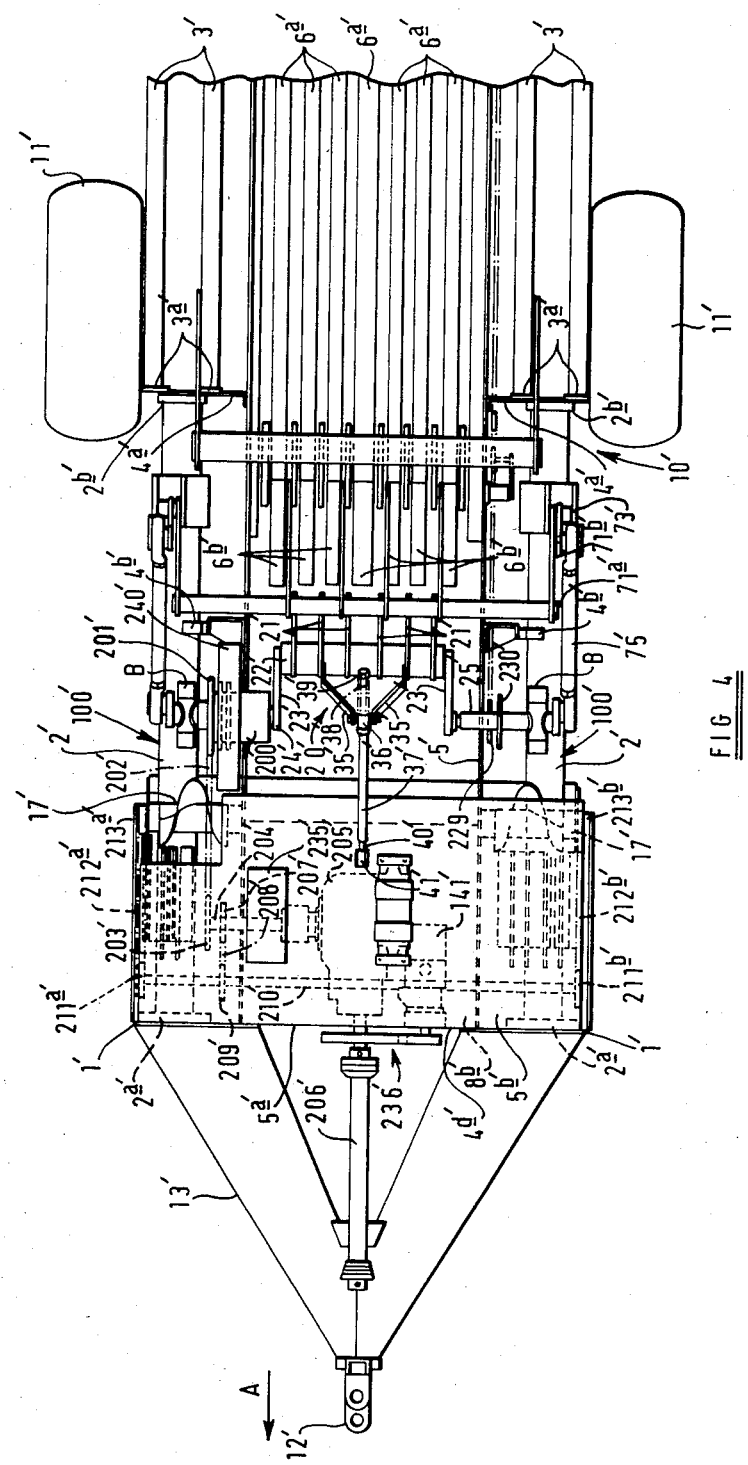

AGRICULTURAL BALER

CROSS-REFERENCE TO RELATED INVENTIONS

The present application is a continuation-in-part of my co-pending application, Ser. No. 662,135, filed Oct. 18, 1984, the contents of said application being incorporated by reference herein.

BACKGROUND OF THE INVENTION

1. Field of the Invention

This invention relates to a mobile apparatus for compressing crop such as hay, straw, grass or other forage crops into bales, hereinafter referred to as a baler.

2. Description of the Prior Art

Balers are known in which crop is compressed, as a result of friction between the crop and walls of a compression chamber into which the crop is packed and lengths of the thus compressed crop are sequentially tied to provide bales of crop. The bales provided by such a baler are of relatively low density.

An object of the invention is to provide a baler which is capable of producing bales of higher density than produced by such known balers. A further object is to provide a baler which provides such bales of higher density and which have a larger volume than bales provided by such known balers.

SUMMARY OF THE INVENTION

According to the invention, we provide a baler comprising a body having; support means to permit of the baler being advanced over the ground, a pick-up, to pick up crop from the ground, a compression chamber disposed rearwardly of the pick-up, transport means to transport crop along a path rearwardly from the pick-up into the compression chamber, a compression member, movable into an operative position in which the compression member is disposed within the compression chamber, and movable rearwardly when in said operative position to compress crop against a stop; and movable into an inoperative position, in which the compression member is disposed outside the compression chamber, and movable forwardly when in said inoperative position to return the compression member to the front of the compression chamber.

In this specification, the terms forwardly and rearwardly are used with respect to the direction of advance of the baler over the ground, in use.

The pick-up may be carried by a part of the body which is rigidly interconnected with a part of the body which carries the transport means and with the compression chamber, the transport means being disposed rearwardly of the pick-up, and the compression chamber being disposed rearwardly of the transport means.

The transport means may feed further crop into the compression chamber whilst the compression member is compressing crop already fed into the compression chamber by the transport means.

The transport means may feed crop rearwardly in batches which are spaced apart longitudinally of said path.

In this specification reference to the compression member being in an operative position disposed within the compression chamber is intended to mean that at least that part of the compression member which is to engage crop in the compression chamber to compress the crop is disposed within the compression chamber although there may be other parts of the compression member not so disposed (for example at the beginning of movement of the compression members longitudinally of the compression chamber to compress the crop).

Means may be provided to move the compression member into said operative position along a track at least part of which is disposed forwardly of, and spaced from, the forward end of the crop which has been transported into the compression chamber by the transport means and so that the compression member passes into said path rearwardly of, and spaced from, a further crop to be transported into the compression chamber by the transport means.

The compression member may be moved into said operative position by being moved laterally inwardly towards the longitudinal axis of the compression chamber and by being moved longitudinally rearwardly.

The compression member may be moved laterally inwardly forwardly of a part of the transport means which is engaged with the crop in the compression chamber.

The compression member may be moved so as to have a compound motion having a component of motion longitudinally of the compression chamber simultaneously with a component of motion transversely thereof.

The component of motion longitudinally of the compression chamber may bring the compression member at least partially into the compression chamber and hence at least partially to said operative position.

Where the compound motion does not move the compression member fully into the compression chamber, and hence fully into the operative position, the compression member is moved into the compression chamber and hence into the operative position by movement of the compression member in the same direction as the memeber takes during said movement rearwardly in said operative position to compress the crop.

The compression member may be mounted for pivotal movement about an axis transverse to the longitudinal axis of the compression chamber whereby rotation of the compression member about said axis causes said compound motion.

The compression member may be pivoted about said axis by a fluid-operated ram means.

The compression member may be mounted for movement longitudinally of the longitudinal axis of the compression chamber independently of said pivotal movement to move the compression member from adjacent the front to adjacent the rear of the compression chamber.

The compression member may be reciprocated longitudinally of the compression chamber by fluid operated ram means.

The fluid-operated ram means which cause longitudinal movement of the compression member may be independent of the fluid-operated ram means which cause said pivotal movement of the compression member.

Two compression members may be provided mounted one at each of opposite sides of the compression chamber. Said opposite sides may comprise top and bottom sides.

The or each compression member may comprise a plurality of spaced elements which in said operative position project through elongate openings in the walls of the compression chamber.

The transport means may comprise a first feed means to feed a batch of crop rearwardly from the pick-up to a second feed means which feeds said batch of crop further rearwardly and into the compression chamber.

The crop may be more compressed after it has been fed by the second feed means than it was after it had been fed by the first feed means.

Where the transport means comprises first and second feed means, said part of the track of movement of the compression member may be disposed at a location forwardly of, and spaced from, a batch of crop which has been fed rearwardly into the compression chamber by the second feed means and rearwardly of, and spaced from, a further batch of crop which is to be fed rearwardly by the first feed means.

Means may be provided temporarily to interrupt feed of crop by the transport means whilst the compression member is moved to said operative position and, if desired, during a first part of said movement of the feed means longitudinally of the compression chamber.

The first feed means may comprise a first crop feed member movable in a closed path to perform a feed movement in which crop is fed rearwardly, and a return movement in which the first feed member is moved forwardly out of engagement with the crop.

The first feed member may be pivotally mounted on a member which is rotatable about an axis, the feed member being fixed relative to an element disposed on the opposite side of said pivotal connection to a crop-engaging part of the feed member, which element is pivotally connected to a link which is itself pivotally connected to the body.

The crop-engaging part of the first feed member may comprise a plurality of tines.

The second feed means may comprise at least one second feed member mounted for reciprocatory pivotal movement about an axis, so that a crop-engaging part thereof engages the crop fed rearwardly by the first feed means and advances the crop rearwardly into the compression chamber and is then returned along the same path before the first feed means feeds further crop rearwardly.

The second feed means may comprise a second feed member mounted for reciprocatory pivotal movement on one side only of said path.

The second feed means may comprise a pair of second feed members mounted for reciprocatory pivotal movement on opposite sides of the path.

The transport means may feed crop from the pick-up towards and into the compression chamber in a direction which lies or is parallel, or substantially parallel, to a direction lying in a vertical plane containing the longitudinal axis of the compression chamber.

The transport means may feed crop from the pick-up towards and/or into the compression chamber in, or parallel, or substantially parallel, to, a direction which is inclined to a horizontal plane containing the longitudinal axis of the compression chamber at less than 90° and preferably less than 45°, and still more preferably not more than approximately 30°, and may be not more than approximately 15°.

The longitudinal axis of the compression chamber may extend forwardly and rearwardly, i.e. parallel to the direction of advance of the baler.

The bale may be discharged from the compression chamber in a direction parallel to the longitudinal axis of the compression chamber.

The baler may be provided with means to tie compressed bales.

The stop may comprise a door at the rear of the compression chamber, the door being openable to permit of discharge of a tied bale from the rear of the compression chamber.

BRIEF DESCRIPTION OF THE DRAWINGS

Two embodiments of the invention will now be described by way of example, with reference to the accompanying drawings, wherein:

FIG. 1 is a side view of a front part of a first baler embodying the invention;

FIG. 2 is a plan view of the part of the baler shown in FIG. 1 with parts omitted for clarity;

FIGS. 3a-3h are diagrammatic longitudinal cross-sectional views through the baler of FIGS. 1 and 2 showing different stages in the sequence of operations thereof;

FIG. 4 is a plan view, with parts omitted for clarity, of a front part of a second baler embodying the invention;

DESCRIPTION OF THE PREFERRED EMBODIMENTS

Figure 1A:
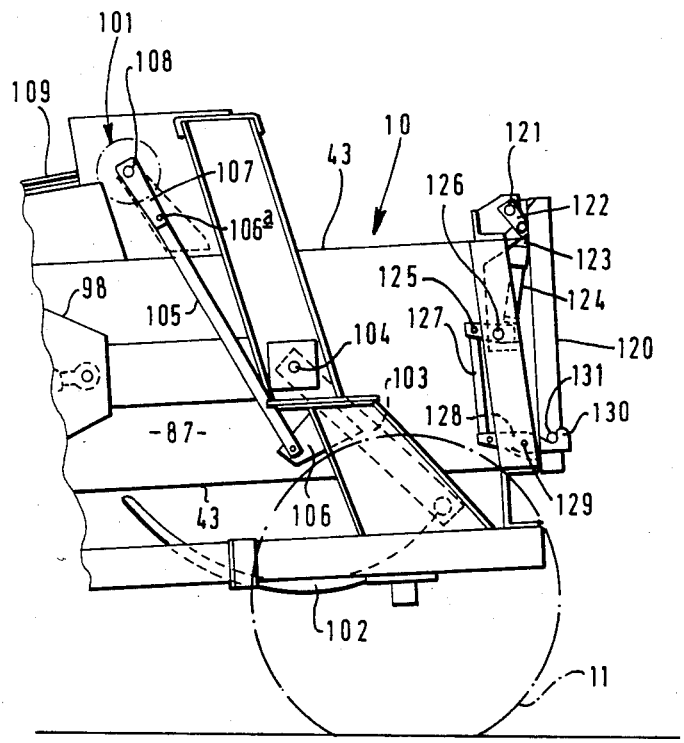
FIG. 1a is a side view of a rear part of the baler of FIG. 1 embodying the invention.

Referring to FIGS. 1 to 3h of the drawings, a baler comprises a body 10 which is advanceable over the ground, in use, in the direction of the arrow A by virtue of being provided with two rear ground-engageable wheels 11 and a towing hitch 12 provided on a draw bar 13 at the front of the body 10 for connection to a conventional towing hitch of a tractor. In the present example, the towing hitch of the tractor is adjustable up and down to adjust the height of the front of the body 10 above the ground to optimise crop pick-up.

Mounted on supports 14 pivoted to the front of the body 10 is a conventional pick-up rotor 15 having tines 16. The rotor 15 extends across the full width of the baler and indeed projects beyond the sides of the body 10. Associated with the end parts of the rotor 15 are archimedes screw type conveyors 17 which feed crop picked up by the end parts of the rotor 15 transversely inwardly towards the centreline of the body and hence into position to be engaged by a first feed means 20. The first feed means 20 comprises eight tines 21 fixed to a transversely extending shaft 22 connected by crank members 23 to stub shafts 24, 25, rotatably mounted on the side wall 42 of the body 10.

The shaft 25 carries a bevel gear 26 meshed with a further bevel gear 27 rotated by a shaft 28 driven by a gearbox 29, shaft 30, gearbox 31, shaft 32, pinions 33 and a coupling 34 by a conventional power take off shaft of the tractor.

Fixed to two adjacent pairs of tines 21 are elements 35 which extend generally diametrically away from the shaft 22 opposite to the tines 21 and at their ends are pivotally connected to a bush 36 slidably mounted on a link 37 with a coil compression spring 38 engaged between the bush 36 and a nut 39 on the link 37. At their other ends, the links 37 are pivotally connected as shown at 40 to brackets 41 provided on the draw bar 13.

Thus, as the shafts 24, 25 are rotated by the bevel gear 26, the crank members 23 rotate and cause the tip T of the crop-engaging part of the tines 21 to describe the path indicated at $P_1$ in FIG. 1, so that crop picked up by the rotor 15, including the crop fed transversely by the screw conveyor 17, is fed rearwardly along a crop path P defined by side walls 42 and upper and lower walls 43a, 43b respectively.

The shaft 25 extends beyond the bevel gear 26 and carries at its outer end a sprocket 50 engaged by a chain 51 which passes via a tensioning roller 52 to a sprocket 53 which rotates with a further sprocket 54 with which a chain 55 is engaged which passes round a sprocket 56 connected to the left-hand end, in the direction of advance, of screw conveyor 17. Carried on the same shaft as the sprocket 53 is a pinion which is engaged with a further pinion carried on a shaft which carries a sprocket 59 which drives, by a chain 60, a sprocket 61 on the main shaft 62 of the rotor. At its opposite end, the shaft 62 carries a sprocket 63 connected by a chain 64 to a sprocket 65 which drives the right-hand screw conveyor 17.

The tines 21 comprise a first feed means of a transport means which feeds the crop rearwardly of the baler. The transport means also comprises a second feed means which comprises two sets of four second feed members 70, 71, the members 70 being disposed at the lower wall 43 of the body 10 and the members 71 at the upper wall 43 of the body 10.

The members 70, 71 each comprise a pair of spaced parallel plates having a crop-engaging surface part 72 of the configuration shown in FIG. 1 which has been found to facilitate crop movement. The members 70, 71 are fixed to a shaft 73 which extends transversely of the body 10 and is mounted for pivotal reciprocation thereon, and carries a crank 74 connected by a connecting link 75 to a crank 76 carried on a shaft 77 having a sprocket 78 rotated by a chain 79 from a sprocket 80 carried by the shaft 25. Thus, as the shaft 25 rotates, the chain 79 rotates the shaft 77 and the links 75 cause reciprocation of the members 70, 71 from a forward position shown in FIG. 1, to a rearward position in which the members 70, 71 extend generally vertically from their associated shaft 73. The chain 79 passes over an idler 81.

As hereinafter to be described in more detail, the hereinbefore described drive mechanism for the first and second feed means are synchronised so that a batch of crop fed along the crop path P by the tines 21 is delivered to a position, for engagement by the members 70, 71, when they are in their position shown in FIG. 1 so that the crop is further moved rearwardly by pivotal movement in the appropriate direction of the members 70, 71, and so that the members 70, 71 can return to their original position before the tines 21 feed a further batch of crop into position for engagement by the members 70, 71.

Loops 82 are provided on the opposite side of the members 70, 71 to the crop-engaging part 72 thereof to help prevent trapping of crop on return movement of the members 70, 71 to the position shown in FIG. 1.

It will be seen that the path defined by the surfaces 42, 43a, 43b immediately rearwardly of the pick-up rotor 15 is relatively wide in transverse direction and narrow in a vertical direction and has a longitudinal axis which lies in a vertical plane which extends longitudinally of the baler but is inclined rearwardly and upwardly at an angle of approximately 15°.

At approximately the region where the second feed means engages the crop fed by the first feed means, the upper wall 43a is stepped further upwardly, as indicated at 84. The smaller cross-sectional area of the part of the path P along which the first feed means transports crop, compared with the cross-sectional area downstream of the stepped region 84 gives better control of the movement of the crop from the pick-up and gives better distribution of the crop in the part of the path P between the stepped region 84 and a compression chamber 87, hereinafter to be described, and also the compression chamber 87 is filled to the top to give better distribution of the crop in the chamber 87. The lower wall 43b extends generally parallel to the longitudinally extending axis of the baler, as indicated at 85 and rearwardly of the portion 85, the lower wall 43 is stepped downwardly, as indicated at 86, to provide a shoulder to help control spring back of the crop after the crop has been fed into the compression chamber 87 by the second feed members 70, 71. The compression chamber 87 is defined by the region within the upper, lower and side walls 42, 43a, 43b in which a compression means in the present example comprising compression members 90, 91, hereinafter to be described, acts on crop to compress it. In the compression chamber 87, the walls 42, 43 are substantially parallel throughout its length.

Two compression members 90, 91 are provided, each comprising a set of four elements comprising spaced parallel plates of a spacing to be capable of receiving part of the second feed members 70, 71 therebetween. The compression members 90, 91 are fixed to associated shafts 92, 93 which extend transversely of the baler above and below the walls 43 thereof. The shafts 92, 93 at their opposite ends are connected by links 94 pivoted to a piston head 95 carried on a piston 96 of a hydraulic ram 97 fixed to a triangular bracket 98 in which the shafts 92, 93 are pivotally mounted, one disposed on each side of the baler. In FIG. 1 the upper set of members 90 are shown in their inoperative position whereas the lower set 91 are shown in their operative position.

Each bracket 98 is mounted for reciprocation rearwardly and forwardly longitudinally of the compression chamber 87 by means of a further hydraulic ram 100, one disposed on each side of the baler.

The baler is provided with a conventional bale tying device, indicated generally at 101, comprising curved needles 102 carried on a lever 103 which is reciprocated about axis 104 by a link 105 connected to a bracket 106 fixed to the lever 103, and pivotally connected, as shown at 106a, to a crank 107 rotated about an axis 108 by a shaft 109 through a gearbox 110. The shaft 109 is driven by a gearbox 111 on the shaft 24 of the first means described hereinbefore.

The rear of the compression chamber 87 is closeable by a stop comprising a door 120. The door 120 is fixed to the shaft 121 which is mounted for rotation on the body. Fixed to the shaft 121 is a crank 122, which is connected to the piston rod 123 of a hydraulic ram, the cylinder 124 of which is pivotally connected to a link 125 which is pivoted, at 126, to the body. The lever 125 is connected by a link 127 to a further lever 128 pivoted at 129 to the body, and having a latch portion 130 to engage with a pin 131 of the door 120.

When it is desired to open the door, hydraulic fluid is first fed into the cylinder 124 to extend the piston rod 123, but as the door is held closed by the latch 130, the piston 124 moves downwardly to pivot the lever 125 clockwise as shown in FIG. 1, and hence to pivot the lever 128 clockwise to release the latch 130 from the pin 131, whereupon the door is free to move. As movement of the lever 125 is limited by engagement of a part thereof with the body, when movement of the lever 128 is thus stopped, movement of the cylinder 124 ceases and the piston rod 123 moves upwardly to pivot the crank 122 anti-clockwise and hence to rotate the shaft 121 and thus open the door 120.

The height of the pick-up rotor 15 above the ground is adjusted by adjusting the height of the towing hitch on the tractor. If desired however, other means may be provided to adjust the height of the pick-up rotor, either by mounting the pick-up rotor adjustably upon the body or providing the draw bar 13 with height adjustment means.

Mounted on the draw bar 13 is a reservoir 140 for hydraulic fluid, together with a pump 141 which is driven from the pinion 33 on the shaft 32 by a pinion 34. Suitable hydraulic fluid lines 142 extend from the pump and reservoir to the rams described hereinbefore. These items are omitted from FIG. 2 for clarity.

In use, the baler is advanced over the ground by the tractor and crop is picked up by the pick-up rotor 15, and fed by the rotor 15 aided at the sides by the screw conveyors 17 towards the mouth of the path P defined by the walls 42, 43a, 43b. A batch of crop accumulated at the mouth, as shown in FIG. 3a, if fed, in an amorphous mass, by the tines 21 of the first feed means rearwardly to the position shown in FIG. 3b, whereupon the members 70, 71 of the second feed means feed the batch, in an amorphous mass, further rearwardly into the compression chamber as shown in FIG. 3c. The crop is more compressed after it has been fed by the second feed means than it was after it had been fed by the first feed means.

The members 70, 71 and tines 21 are then returned to their foremost position as described hereinbefore, and are synchronised accordingly. The above described operation is then repeated and a stage of this is shown in FIG. 3d where the second feed means are about to advance a second batch of crop which has been fed into position for engagement thereby. FIG. 3e shows a slightly later stage where a second batch of crop has been moved into the compression chamber by the members 70, 71 of the second feed means.

As illustrated in FIG. 3e, the compression members are maintained in an inoperative position in which they lie outside the compression chamber and they remain in this position until the compression chamber has been filled with a desired amount of material to form a bale. When the chamber has been filled with the appropriate amount of material, this is sensed by suitable sensing means. Preferably the sensing means does not sense the pressure on the door, since this can vary with the type of crop but rather the force required by the second feed members 70, 71 to transport crop into the compression chamber 87.

Figure 3F:
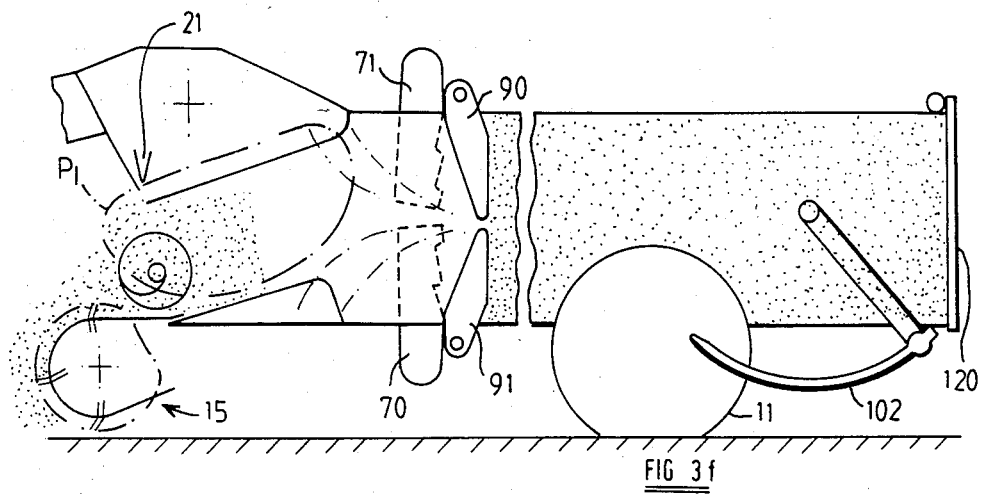

Thereupon, the hydraulic rams 97 are operated to move the compression members 90, 91 friom their inoperative position shown in FIG. 3e, to their operative position shown in FIG. 3f. It will be noted that the compression members 90, 91 are each moved into their operative positions along a track which over a major part of its length is forward of the front face of the crop in the compression chamber, which front face is engaged by the rearward face of the second feed members 70, 71. In addition, the above mentioned part of the track is rearward of the next batch of crop to be fed rearwards by the feed means. This ensures that there is no jamming as described in more detail hereinafter in connection with the second embodiment. When the compression members 90, 91 have been moved into their operative position, the rams 100 are operated to move the compression members rearwardly longitudinally of the compression chamber 87 to compress crop therein.

Figure 3G:
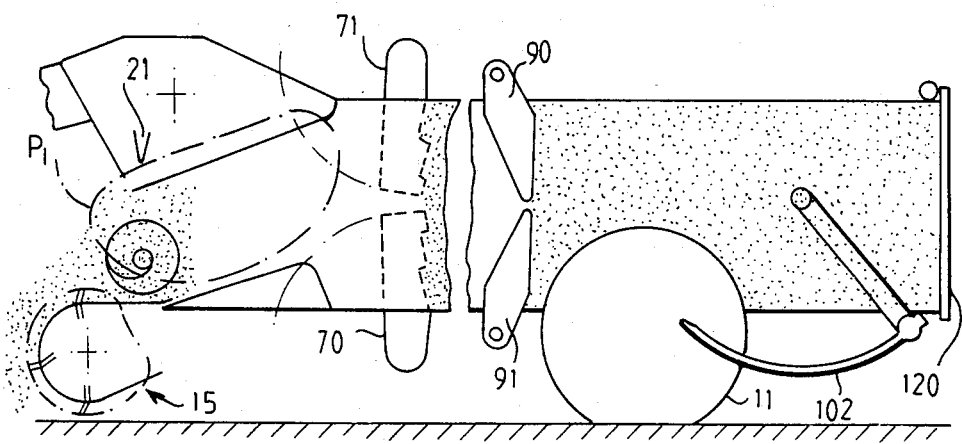

During this operation, the first and second feed means continue to operate to feed further crop into the compression chamber behind the compression members, as illustrated in FIG. 3g.

Figure 3H:
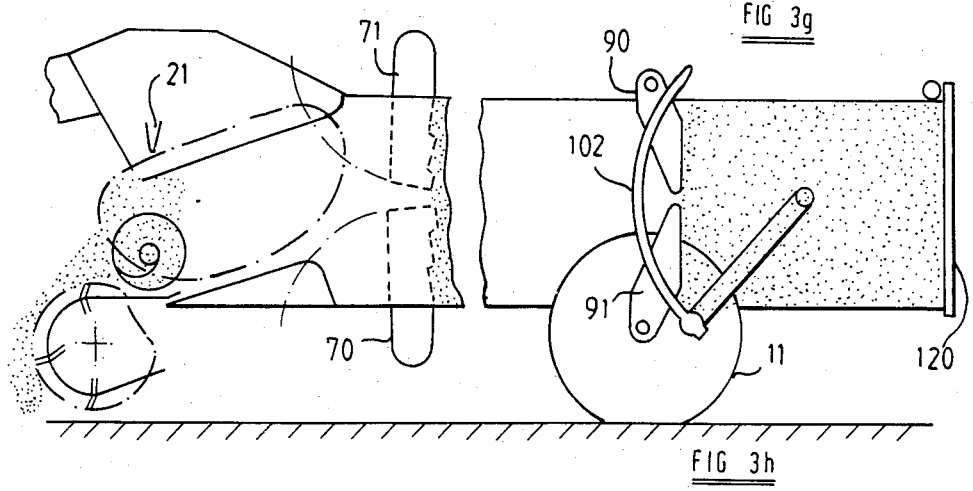

When the compression members have moved fully rearwardly to the desired position to produce a compressed bale, the bale tying means 101 is operated to tie the bale, as shown in FIG. 3h, and then the needles 102 of the bale tyer are withdrawn and the ram 123, 124 is operated, as described hereinbefore, to open the rear door and the bale, which has been over compressed by the compression members 90, 91 expands rearwardly and is ejected. The compression members are then pivoted to their inoperative position by reversal of the direction of operation of the arms 97 and when in their inoperative position are returned forwardly towards the front of the compression chamber past further crop fed into the compression chamber by the feed means 21, 70, 71 by reversal of the direction of operation of the rams 100.

As mentioned previously, operation of the first and second feed means continues during compression and ejection of the bale and return of the compression members to their forward position. The compression members are again caused to operate to form a bale when the sensing means again senses that the necessary amount of material has been entered into the compression chamber.

Referring now to FIGS. 4 to 10 of the drawings, in a second embodiment of the invention a baler comprises a body 10' which is advanceable over the ground, in use, in the direction of the arrow A by virtue of being provided with two rear ground-engageable wheels 11' and a towing hitch 12' provided on a draw bar 13' at the front of the body 10' for connection to a conventional towing hitch of a tractor. As in the first embodiment, the towing hitch of the tractor is adjustable up and down to adjust the height of the front of the body 10' above the ground to optimise crop pick-up.

The body 10' comprises a draw bar 13', hydraulic cylinders 2' and a bale chamber assembly 5'. The draw bar 13' is a welded fabrication in steel plate and provides, in the interior thereof, a reservoir for hydraulic fluid. The draw bar 13' has flanges 1' to which are bolted flanges 2a' at one end of the hydraulic cylinders 2' of rams 100'. Bolted to a flange 2b' at the opposite end of the cylinders 2' is a flange 3a' welded to a pair of channel-section elongate members 3' which are disposed side by side with the open mouths of the channels facing inwardly. At their rear ends the members 3' are connected together by a transverse member 4' which projects inwardly and is bolted to the bale chamber assembly 5' which is a welded fabrication. The bale chamber assembly 5' is also connected to the cylinders 2' and members 3' by brackets 4a' clamped between the flanges 2b' and 3a', brackets 4b' welded to the cylinders 2' and a transverse front plate 4d' of the bale chamber assembly 5' which is clamped between the flanges 1' and 2a'.

The wheels 11' are carried on an axle 11a' supported on a plate 11b' connected to the outer of each of the elongate members 3' and which is strengthened by webs 11c'.

The bale chamber assembly 5' comprises spaced parallel side members 5a', the front transverse plate 4d' mentioned hereinbefore and an extension part thereof which provides a top plate 5b'. The upper surface of the bale chamber assembly over the majority of the length thereof rearwardly of the top plate 5b' is provided by a plurality of spaced parallel channel-section elongate members 6a' whilst the lower surface of the bale chamber assembly in the region below the elongate members 6a' is made up of similar elongate channel-shape members 6b' but the members 6b' extend further forwardly than the members 6a' and are connected at their forward end to a transversely extending member 6c' which is connected to the side plates 5a'. Extending transversely between the side plates 5a' generally forwardly of elongate members 6a' and 6b' are upper and lower stripper bar assemblies 7', 8' respectively, see FIG. 8. They are not shown in FIGS. 4 and 5 for clarity.

The bars 7a' of the upper stripper bar assembly 7' are channel-shape members and are connected at their rear ends to the forward ends of the members 6a' whilst the bars 7a' at their forward ends are connected to an angle section transversely extending member 7b' welded to the underside of the side plates 5a' and are supported intermediate their ends by webs 7c' which depend downwardly from a bracket 7d' fixed to the side plates 5a'.

The bars 8a' of the lower stripper bar assembly 8' are provided by tongues cut in a plate 8b'. The plate 8b' is connected at its front end 8c' to the side plates 5a' and is supported intermediate its ends in two positions 8d', 8e' by a member 6c' connected between the plates 5a'. The rear ends of the tongues connected to the lower elongate members 6b' as shown at 8f'.

Mounted on supports 14' at the front of the body 10' is a conventional pick-up rotor 15' having tines 16'. The supports 14' are pivotally connected to brackets, not shown, fixed to the side plates 5a'. The rotor 15' extends across the full width of the baler. Associated with the end parts of the rotor 15' are archimedes screw type conveyors 17' which feed crop picked up by the end parts of the rotor 15' transversely inwardly towards the centreline of the body and hence into position to be engaged by a first feed means 20'. The first feed means 20' comprises six tines 21' fixed to a transversely extending shaft 22' connected by crank members 23' to stub shafts 24', 25', rotatably mounted in bearings B carried on the cylinders 2' of the body 10'. The tines 21' are disposed so as to extend through the upper wall 43a' of the body 10' comprised by the upper stripper bars 7a'.

The shaft 24' is driven via a hydraulically operated torque limiting clutch 200'. The shaft 24' is connected to an output member of the clutch 200' whilst an input member of the clutch, which comprises a clutch body 241', is connected to a flywheel 240' and a sprocket 201' which is driven by a chain 202' from a further sprocket 203' rotated by a shaft 204' driven by a bearbox 205' which is driven by a universally jointed shaft 206' by a conventional power take off shaft of the tractor.

The output member 242' is encircled by a pair of caliper arms 243' pivotally interconnected and connected to the stub shaft 24' by a pivot pin 244' carried by an arm 24a' fixed to rotate with the stub shaft 24'. The other ends of the calipers 243' are interconnected by a spring tensioning device indicated at 243a' so that the calipers are urged into frictional engagement with the output member 242'.

The ouutput member 242' is mounted on the shaft 24' for rotation and is normally biased against the clutch body 241' by a coil compression spring 245'. The output member 242' has a cam surface 246' which engages with a corresponding cam surface 247' formed on the clutch body. A sensor disc 248' is carried on the output member to actuate proximity switch M.

Figure 10:
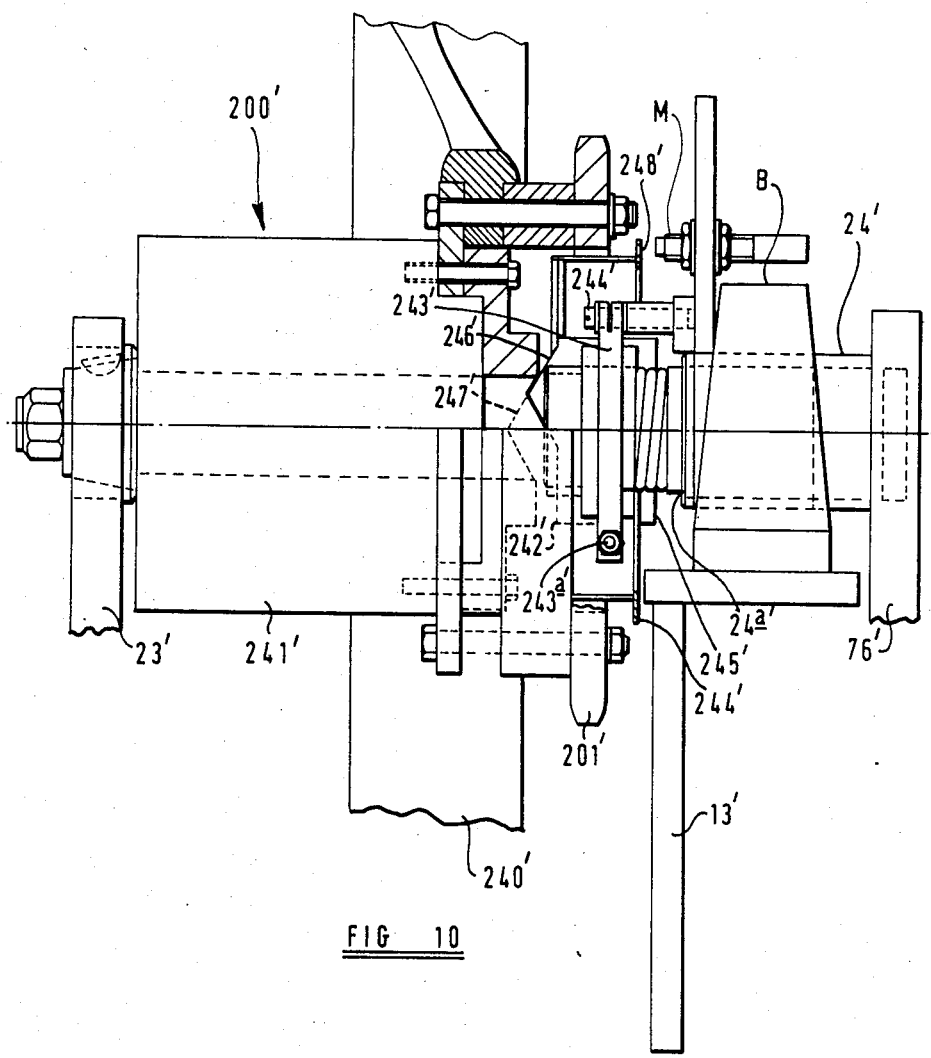
FIG. 10 is a fragmentary side elevation, partly in section, of a clutch in the second baler.

In use, when the resistance to rotation of the shaft 24' exceeds the clutch limit, the clutch body 241' rotates relative to the shaft 24' and hence the clutch body 241' similarly rotates relative to the output member 242' relative movement between cam surfaces 246' and 247' thereby causing the output member 242' to move to the right in FIG. 10 against the bias of the spring 245' thus moving the disc 248' towards the switch M to actuate it.

Referring now again to FIGS. 4 and 5, fixed to the shaft 22' are elements 35' which extend generally diametrically away from the shaft 22' opposite to the tines 21' and at their ends are pivotally connected to a bush 36' slidably mounted on a link 37' with a coil compression spring 38' engaged between the bush 36' and a nut 39' on the link 37'. At their other ends, the links 37' are pivotally connected as shown at 40' to brackets 41' provided on the top plate 5b' of the bale chamber assembly 5'.

Thus, as the shaft 24' is rotated by the sprocket 201', the crank members 23' rotate and cause the tip T of the crop-engaging part of the tines 21' to describe a path similar to that indicated at $P_1$ in FIGS. 3a–3h, so that crop picked up by the rotor 15', including the crop fed transversely by the screw conveyor 17', is fed rearwardly along a front portion of a crop path P having side walls 42' provided by parts of the side plates 5a' and upper and lower walls 43a', 43b' provided by parts of the upper and lower stripper bars 7a', 8a' respectively.

The shaft 204' carries a further sprocket 207' which drives via a chain 208' a sprocket 209' carried on a shaft 210' which extends transversely across the whole width of the baler. At each end of the shaft 210' has sprockets 211a', 211b' which drive by chains 212a', 212b' respectively sprockets 213a', 213b' connected to the screw conveyors 17'.

On the left-hand side of the baler, looking in the direction of the arrow A, the sprocket 213b' is connected to a spur gear 214' which is meshed with a further spur gear 215' carried by the support 14' so as to rotate in planetary fashion relative to the sput gear 214' as the support 14' pivots about axis of connection to the body which is coincident with the axis of rotation of the spur gear 214'. Connected to the second spur gear 215' is a sprocket 216' with which a chain 217' is engaged which drives the pick-up rotor 15' through a sprocket 218' secured to the rotor 15' around which the chain 217' is engaged.

The tines 21' comprises a first feed means of a transport means which feeds the crop rearwardly of the baler along a path P. The transport means also comprises a second feed means which comprises a single set of four second feed members 71', the members 71' being disposed to extend through the upper wall 43a' of the body 10' comprised by the upper stripper bars 7a'.

Figure 8:
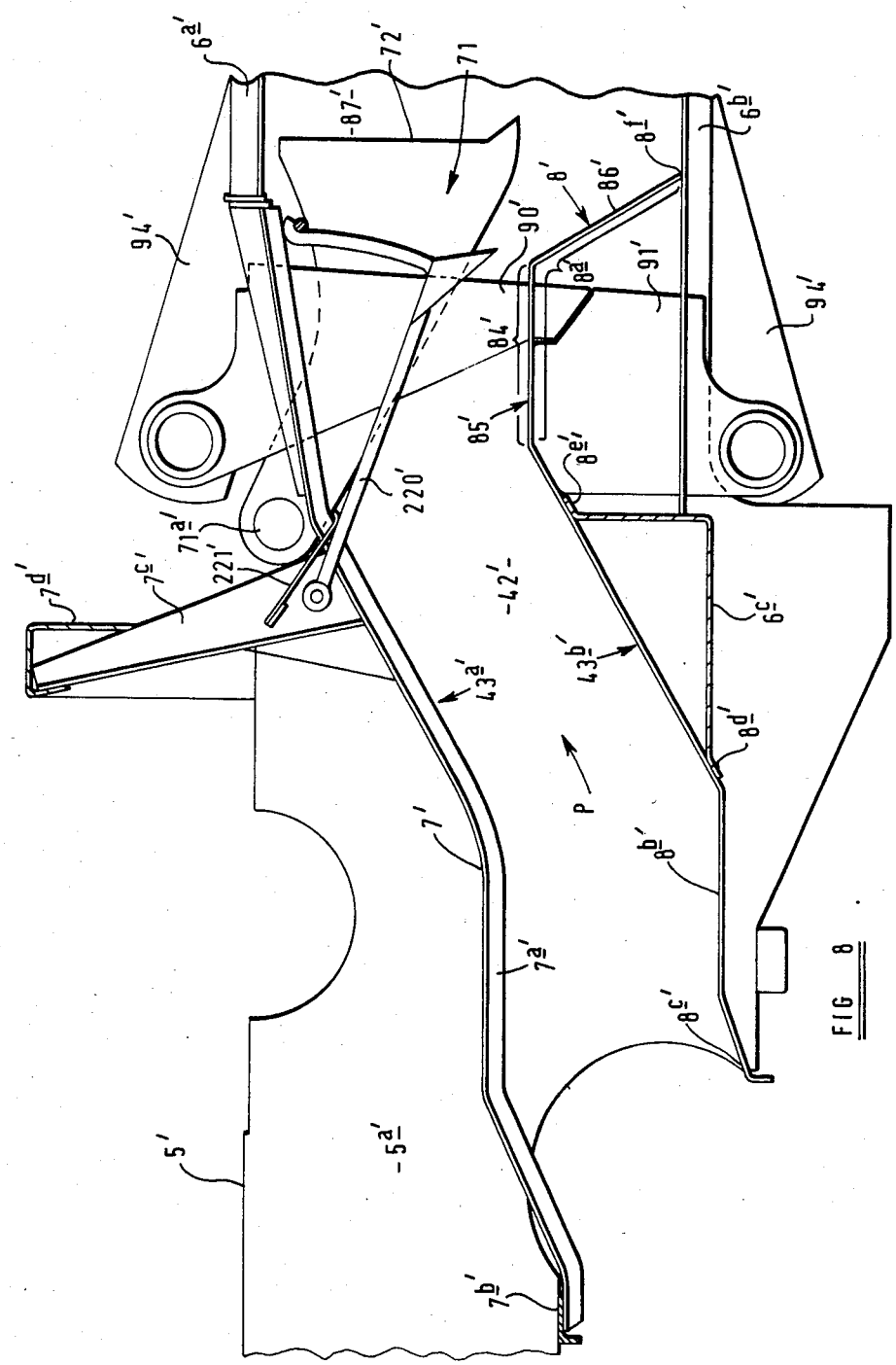
FIG. 8 is a cross-section on the line 8—8 of FIG. 4 with parts omitted for clarity.

The members 71' each comprise a plate having a crop engaging surface parts 72' of the configuration best shown in FIG. 8 which has been found to facilitate crop movement. The members 71' are fixed to a shaft 71a' which extends transversely of the body 10' and is connected by arms 71b' to a shaft 73' which also extends transversely of the body 10' and is mounted for pivotal reciprocation thereon by brackets 73a' carried on the cylinders 2'. The shaft 73' carries a pair of cranks 74' each connected by connecting links 75' to cranks 76' carried on the shafts 24', 25'. Thus, as the shafts 24', 25' rotate, the links 75' cause reciprocation of the members 71' from a foremost position to a rearmost position shown in FIG. 8 in which the surface parts 72' of the members 71' extend generally vertically.

As hereinafter to be described in more detail, the hereinbefore described drive mechanisms for the first and second feed means are synchronised so that a batch of crop fed along the crop path P by the tines 21' is delivered to a position, for engagement by the members 71', when they are in their formost position so that the crop is further moved rearwardly by pivotal movement in the appropriate direction of the members 71', and so that the members 71' can return to their original position before the tines 21' feed a further batch of crop into position for engagement by the members 71'. In FIG. 8 the first feed means, the screw conveyors 17' and rotor and rotor disc are omitted so as more clearly to show the construction of the bale chamber and the crop path.

Hay dogs 220' are pivoted on each web 7C' and are biased downwardly by leaf springs 221' so as to retain the crop in the position to which it has been fed by the members 71'. The hay dogs 220' are, of course, pushed upwardly, against the bias of the leaf springs 221' by the crop when the crop is pushed rearwardly by the members 71'.

It will be seen that the path defined by the surfaces 42', 43a', 43b' immediately rearwardly of the pick-up rotor 15' is relatively wide in transverse direction and narrow in a vertical direction and has a longitudinal axis which lies in a vertical plane which extends longitudinally of the baler and is initially in a plane parallel to the longitudinal axis of the compression chamber but then is inclined rearwardly and upwardly at an angle of approximately 30°.

The smaller cross-sectional area of the part of the path P along which the first feed means transports crop, compared with the cross-sectional area downstream of a region 84' where the lower surface 43b' becomes parallel to the longitudinally extending axis of the compression chamber, gives better control of the movement of the crop from the pick-up and gives better distribution of the crop in the part of the path P between the front of the region 84' and a compression chamber 87', hereinafter to be described, and also contributes to the compression chamber 87' being filled to the top to give better distribution of the crop in the chamber 87'.

Downstream of the upwardly inclined part of the lower wall 43b', the wall 43b' extends generally parallel to the longitudinally extending axis of the baler, as indicated at 85' and rearwardly of the portion 85', the lower wall 43' is inclined downwardly, as indicated at 86'. This provides a shouler to help control spring back of the crop after the crop has been fed into the compression chamber 87' by the second feed members 71'. The portion 85' ensures that crop is fed into the compression chamber near to the top thereof so as to ensure full and uniform filling of the compression chamber 87'.

The raised portion of the bottom surface of the channel is also provided for the following reasons. The primary and secondary feed means have limited extents of operation in the vertical direction and so the configuration of the channel in this region ensures that the whole depth of the channel is swept by the primary and secondary feed members without having excessive length or having to resort to two members for each feed means, one working through the top of the channel and the other through the bottom. The configuration also ensures that a bottom compression member 91', hereinafter to be described, enters the path P via empty space and it also lessens the length of the hay dogs 220' required and avoids the need to provide hay dogs at the bottom of the path P.

The compression chamber 87' is defined by the region of the crop path P within the upper, lower and side walls 42', 43a', 43b' in which a compression means, comprising compression members 90', 91', hereinafter to be described, acts on crop to compress it. In the compression chamber 87', the walls 42', 43' are substantially parallel throughout its length.

Figure 9:
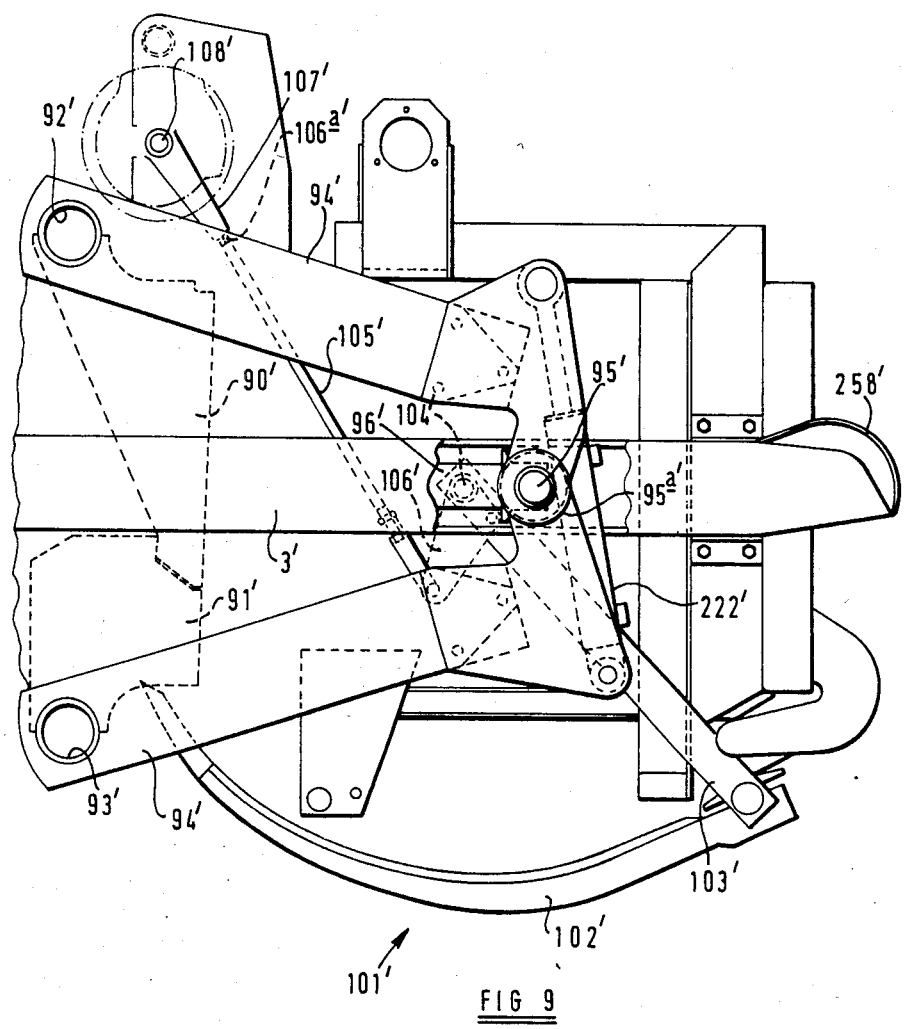
FIG. 9 is a fragmentary side elevation with parts omitted for clarity, partly broken away, showing the connection of the compression members to the rams.

Two sets of compression members 90', 91' are provided, each set comprising eight members comprising spaced parallel plates of a spacing to be capable of passing between the channel-shaped members 6a', 6b' and to be capable of receiving part of the second feed members 71' therebetween. As best shown in FIG. 9, the compression members 90', 91' are fixed to associated shaft 92', 93' which extend transversely of the baler above and below the walls 43' thereof. The shafts 92', 93' at their opposite ends are each rigidly connected to a link 94' which is partially connected to a piston head 95' carried on a piston rod 96' of the rams 100'. Each piston head 95' carries two rollers 95a' which are engaged between inwardly facing walls of the limbs of each channel-section elongate member 3' so as to guide the piston head 95'. The members 90', 91' are thus reciprocated longitudinally of the compression chamber 87' by means of the rams 100'.

Figure 5:
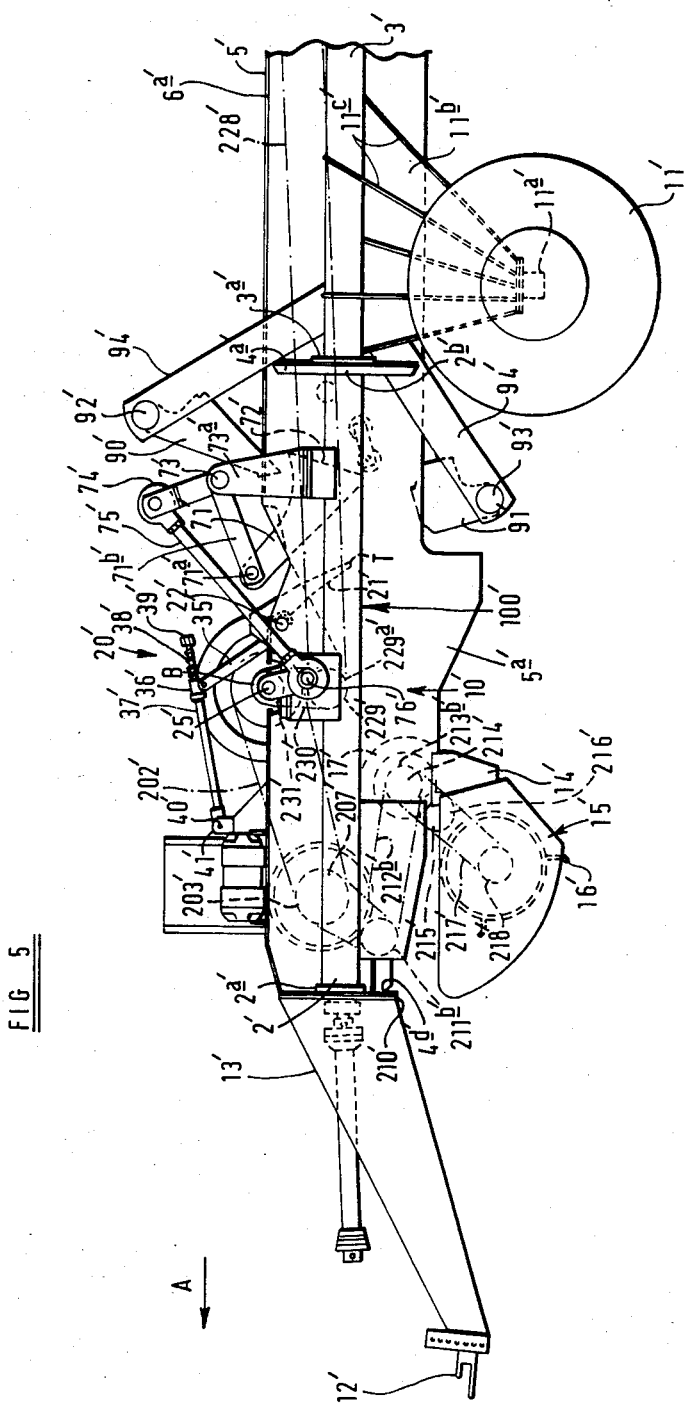
FIG. 5 is a side view of the part of the baler shown in FIG. 4 with parts omitted for clarity.
Figure 6:
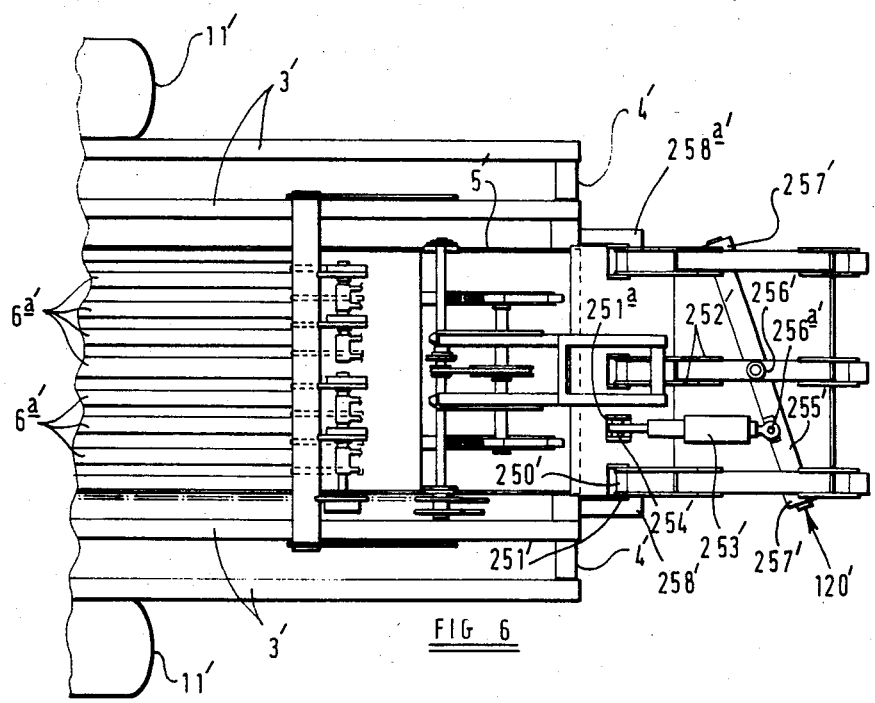
FIG. 6 is a plan view of a rear part of the baler shown in FIG. 4.

The pair of links 94' on each side of the baler are interconnected by a hydraulic piston and cylinder assembly 222' so that extension and retraction of the piston thereof moves the compression members 90', 91' towards and away from each other respectively. In FIG. 5, the compression members 90', 91' are shown in a position in which the members 90', 91' are fully towards the front of the baler and are moved fully away from each other whilst in FIG. 8 they are shown with the piston head 95' in the same position as in FIG. 5 but with the members 90', 91' having been moved fully towards each other.

The baler is provided with a conventional bale tying device, indicated generally at 101', comprising curved needles 102' carried on an arm 103' which is reciprocated about axis 104' by a link 105' connected to a bracket 106' fixed to the arm 103', and pivotally connected, as shown at 106a', to a crank 107' rotated about an axis 108' by a chain 221' engaged with a sprocket 222' and a sprocket 223' fixed to rotate with a further sprocket 224' driven by a chain 225' from a sprocket 226' fixed to rotate with a further sprocket 227' driven by a chain 228' from a sprocket 229' fixed to rotate with a further sprocket 229a' driven by a chain 230' engaged with a sprocket 231' on the shaft 25'.

The rear of the compression chamber 87' is closeable by a stop comprising a door 120'. The door 120' is pivotally mounted on the body by a shaft 250' received in a bracket 251' provided as an extension of the side plates 5a'. Lugs 252' extending upwardly from the door proper 120' are pivotally received on the shaft 250'. A hydraulic ram 253' is pivotally connected to the bracket 251' by a pivot pin 254' and a locking bar 255' as shown at 256a'. The locking bar is itself pivotally mounted on the door 120' as shown at 256' and has at its ends rollers 257', one of which is engageable in a downwardly facing C-shaped retainer 258' and the other of which is engageable in a similar but upwardly facing retainer 258a' on the opposite side of the baler.

When the door is in its fully open position it engages a ejector wheel operating lever 259' which is slidably mounted on a rod 260', there being an apertured bracket 261' to maintain the lever 259' at right angles to the rod 260'. A coil compression spring 262' acts between a stop on the rod 260' and the lever 259' and the rod 260' is pivotally connected as shown at 264' to a bracket 265' at the rear of the bale chamber. The lever 259' is connected by a pivoted link 266' to an ejector wheel carriage 267' which rotatably mounts a plurality of generally star-shaped ejector wheels 268' which are driven by a chain 269' engaged with a sprocket 270' rotatable with the wheels 268' and a sprocket 271' rotatable with the sprocket 223'.

The height of the pick-up rotor 15' above the ground is adjusted by adjusting the height of the towing hitch on the tractor. If desired however, other means may be provided to adjust the height of the pick-up rotor, either by mounting the pick-up rotor adjustably upon the body or providing the draw bar 13' with height adjustment means.

Mounted on the top plate 5b' is an oil cooler 235' for hydraulic fluid, and underneath is a pump 141' which is driven by a chain drive 236' from the input shaft of the gearbox 205'. Suitable hydraulic fluid lines extend between the pump, reservoir and the rams described hereinbefore. These items are omitted from the Figures for clarity.

In use, the baler is advanced over the ground by the tractor and crop is picked up by the pick-up rotor 15', and fed by the rotor 15' aided at the sides by the screw conveyors 17' towards the mouth of the path defined by the walls 42', 43a', 43b'. A batch of crop accumulated at the mouth, as shown in FIG. 3a, is fed in the form of an amorphous mass by the tines 21' of the first feed means rearwardly to a position similar to that shown in FIG. 3b in respect of the first embodiment, whereupon the members 71' of the second feed means feed the batch in the form of an amorphous mass further rearwardly and into the compression chamber. The crop is more compressed after it has been fed by the second feed means than it was after it had been fed by the first feed means.

The members 71' and tines 21' are then returned to their foremost position as described hereinbefore, and are synchronised accordingly. The above described operation is then repeated.

As illustrated in FIG. 5, the compression members are maintained in an inoperative position in which they lie outside the compression chamber and they remain in this position until the compression chamber has been filled with a desired amount of material to form a bale. When the chamber has been filled with the appropriate amount of material, this is sensed by suitable sensing means. Preferably the sensing means does no sense the pressure on the door, since this can vary with the type of crop but rather the force required by the second feed members 70', 71' to transport crop into the compression chamber 87', in the present example, by virtue of the clutch 200' slipping and thus operating the switch M as hereinbefore described. The clutch 200' will slip when the second feed members 71' approach their rearmost position shown in FIG. 8 since this is when maximum pressure is applied to the crop and hence when the second feed members 71' are subjected to the maximum resultant pressure. After the clutch has slipped the members 71' will, therefore, remain in their substantially fully rearward position whilst the tines of the first feed means will remain stopped at the position shown in FIG. 5.

Because the members 71' are stopped, they both serve to hold the crop within the compression chamber and prevent it springing forwardly and also there is no feeding of further crop into the region through which the compression members must pass when they are moved into their operative position as hereinafter to be described.

The actuaion of the switch M by the clutch 220' provides on electrical signal to initiate a compression operation.

A first stage in this operation is movement of the compression members inwardly towards each other by the rams 222' without any movement of the members longitudinally of the compression chamber by the rams 100'. By virtue of stopping the second feed members 71' substantially in the fully rearward position described above, and by virtue of moving the compression members transversely inwardly relative to the axis of the compression chamber, i.e. towards each other, whilst the compression members remain at the forward end of their longitudinal travel, the compression members enter the path P in a region which is essentially devoid of crop and, therefore, avoid any risk of jamming due to the presence of crop or due to crop being fed into the track of the compression members as they are entering the path P.

This is an important factor leading to satisfactory operation of the baler.

Figure 7:
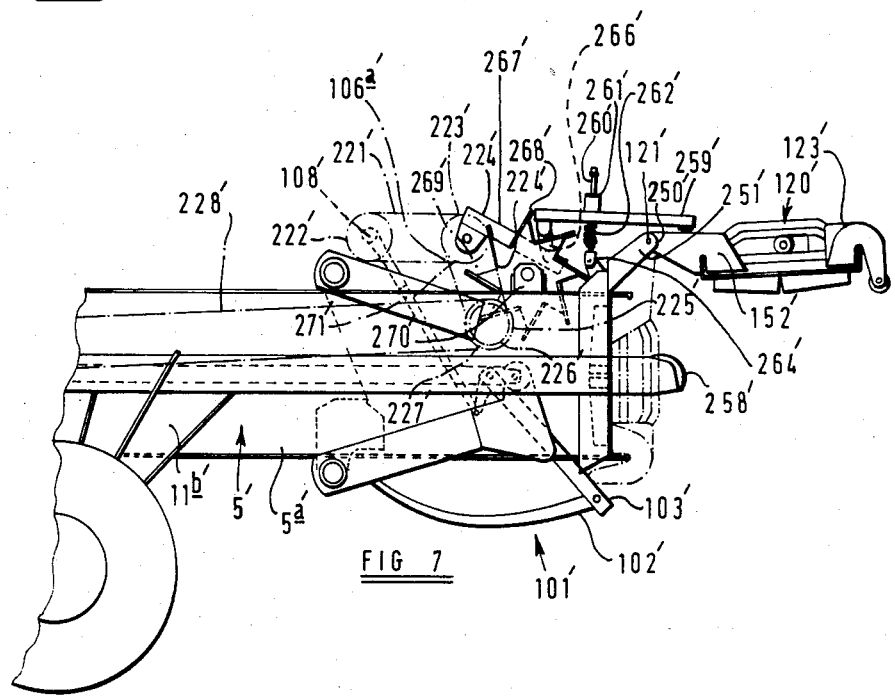
FIG. 7 is a side view partly broken away of the rear part of the baler shown in FIG. 6.

When the compression members 90', 91' have been moved fully inwardly, to the position shown in FIG. 7, by the rams 222' a micro switch is actuated which provides a signal to the rams 100' to cause the pistons thereof to move the piston heads 95' longitudinally of the compression chamber towards the rear thereof, and hence move the compression members 90', 91' towards the rear of the compression chamber to compress the crop against the rear door 120', the door being locked closed as described above.

Initially, movement of the compression members 90', 91' by the rams 100' moves the compression members into engagement with the crop and hence into their operative positions. Then the crop is moved away from the second feed members 71', thus relieving the pressure thereon and so enabling the clutch 200' to re-engage to move the second feed members 71' fully to their rearward position and then to return them to their initial position. If the second feed members 71' move rearwardly again before the cylinders 2' have moved the compression members sufficiently rearwardly that their forward surfaces are rearward of the rearward surface of the second feed members when the second feed member thus again approach their rearmost position, the second feed members would tend to jam crop between the elements of the compression members. To avoid this a pivoted stop is built into the front of one of the secondary feed members 71' which prevents the secondary feed member passing the forward face of the compression members, but permits the compression members to pass rearwardly through the second feed members during movement to their operative position. Engagement of the stop therefore causes the cluch again to slip until the compression members move rearwardly sufficiently that the feed members 71' are again relieved of pressure.

In certain conditions the second feed members 71' may be stopped, as a result of the clutch 200 slipping when they are spaced forwardly of their rearmost position. This depends upon the density and bulk of the crop which happens to be in the last batch moved rearwardly by the second feed members 71'. If the density and bulk of the batch is relatively great then the second feed members 71' can stop sufficiently forwardly of their rearmost position that the compression members 90', 91' are moved into engagement with the crop and hence into their operative positions as a result only of their pivotal movement and this pivotal movement may tend to relieve the second feed members 71' of pressure thus causing the clutch 200' to re-engage to recycle the second feed member. In such circumstances, as the second feed members again approach their rearmost position with a further batch of crop, they would tend to force crop between the elements of the compression members since the compression members would not, by that stage, have been moved sufficiently rearwardly by the cylinders 2'. Thus, again, the above mentioned stop is operative to prevent such jamming.

Intially the rams 100' operate regeneratively and as the compression members 90', 91' approach the rearward end of their permitted travel a switch is actuated which ceases regenerative operation of the rams so that they move more slowly at increased pressure over the last portion of their travel.

When the compression members 90', 91' have moved fully rearwardly a further micro switch provides a signal to indicate this fact and signals the knotting apparatus to operate to tie the bale in conventional manner.

When the bale has been tied and the needles have returned to their internal position, the micro switch sensing return of the needles to the original position provides a signal to the ram 253' to extend to pivot the locking bar 255' to move the rollers 257' out of the retainers 258'. With the door thus unlocked the natural tendency for the bale to expand rearwardly initially moves the door open passed the above mentioned top dead centre position of the ram so that continued extension of the ram pivots the door upwardly to its fully open position.

Figure 2A:
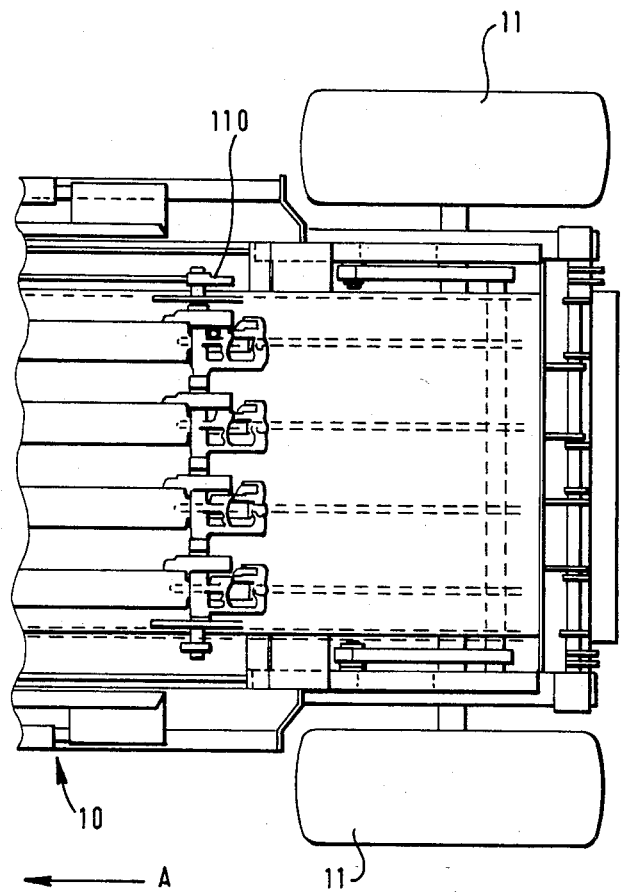
FIG. 2a is a plan view of the part of the baler shown in FIG. 1a with parts omitted for clarity.

As the door moves to its fully open position, the lever 259' is pivoted in an anti-clockwise direction in FIG. 2 to move the ejector wheels 268' downwardly into engagement with the top of the bale so that the bale is driven out of the bale chamber by rotation of the wheels 268'.

After a bale has been ejected a sensor, which senses that the bale has been ejected, causes the hydraulic ram 253' to operate to allow the door to close. After the door has moved substantially towards a vertical downwards position, the line connecting the positions of pivotal connection 256' and 254' of the ram to the door bracket become aligned, or substantially aligned, with axis of pivot of the door 250' and thus further retraction of the ram does not close the door further. However, in this position the weight of the door is such that the effect of gravity moves the door to its fully closed position thus taking the line of action over the bottom dead centre position so that continued retraction of the ram pivots the bar 255' to a horizontal position with the rollers 257' within the retainers 258'.

The sensor which senses when the bale has left also provides a signal via a micro switch to cause the cylinders to retract the piston rods and return the compression members to their initial position. Initially the return occurs with the compression members in their fully laterally inward position since this is necessary for them to clear the knotters.

When the piston head has moved sufficiently far forwardly the rams 222' are actuated to pivot the compression members outwardly so that the remainder of the travel to their initial position occurs with them in their fully outward position. The door is also signalled to close. In practice the lower compression member moves first to its fully open position under the influence of gravity and then when it has reached this position the ram lifts the other compression member against the influence of gravity.

It is to be noted, in FIG. 8, that a gap is provided between the adjacent end surfaces of the cleavers so that if any crop happens to be in the region forwardly of the second feed means whilst the cleavers are moved laterally inwardly, it does not get trapped between the surfaces and so does not prevent the compression members 90', 91' moving into their fully inward position.

The compression members 90', 91' rotate about their axes of pivotal connection to the piston head 95' so that they move towards the longitudinal axis of the compression chamber at a position which is on the forward side of the connection to the piston head. Thus, the compression members 90', 91' can enter the path P forwardly of the second feed members 71' whilst the piston heads are disposed rearwardly thereof so that, in designing the apparatus, no constraints are imposed upon the location and mechanism for operating the primary and secondary feeds or for moving the compression members 90', 91' inwardly or longitudinally since their operating mechanisms are longitudinally spaced.

It is to be emphasised that in the present invention the compression members are moved transversely inwardly into the crop path P in a region where the crop channel is empty, thereby avoiding any need for the compressing members to have to force their way into a mass of crop which would present serious problems to satisfactory operation of the apparatus. It is by feeding the crop by the primary and secondary feed means in longitudinally spaced batches into the compression chamber and ensuring that the compression members are moved inwardly into the crop channel between batches that satisfactory operation of the baler is assured.

The baler described hereinbefore is intended to produce bales 90 cm wide, 60 cm high and 120 cm long. With silage this produces an average bale weight of 320 kg, an average density of 494 kg per cubic meter and an average output of 28.8 tonnes per hour.

With hay dependent on condition and dry matter content, an average bale weight of 190 kg could be achieved, an average density of 293 kg/M² and an output of 17.1 tonnes per hour, whilst with straw an average bale weight of 130 kg is achieved, a density of 200 kg/M² and an output of 11.7 tonnes per hour.

This is to be compared with a typical conventional baler which produces a bale 36 cm wide, 46 cm high and 1 meter long. Such conventional balers are not used for silage because the bale size is too small. With hay an average bale weight of 27 kg is achieved with a density 163 kg/M² and an output of 16.2 tonnes per hour, whilst with straw an average bale weight of 17 kg is achieved with a density of 103 Kg/M² and an output of 10.2 tonnes per hour.

It will be seen, therefore, that the bale of the present invention provides bales which are not only larger but also more dense than bales produced by a conventional baler.

In general, a density in excess of twice the density achieved with a conventional baler for the same crop under the same conditions can be achieved.

This is achieved by virtue of providing a crop column which is about 2½ meters long and compressing a crop column of this length to a bale length of, in the present example, 88 cm before the bale expands to 120 cm after ejection from the bale chamber.

In its broadest aspect the present invention is capable of producing bales having a cross-sectional area of not less than 0.5 square meters and a bale volume not less than 0.6 cubic meters.

As mentioned previously, operation of the first and second feed means continues during compression and ejection of the bale and return of the compression members to their forward position. The compression members are again caused to operate to form a bale when the sensing means again senses that the necessary amount of material has been entered into the compression chamber.

Although in the above examples the compression means comprises two compression members which are moved pivotally about horizontal axes between their operative and inoperative positions are described, if desired the compression members may be pivoted about vertical axes so as to enter the compression chamber from the sides. Alternatively, only a single compression member may be provided of greater length to extend the full height or width, depending upon the orientation of the axis of pivot. Similarly, although one and two sets of second feed members pivoted about horizontal axes have been described, again if desired the or each of these members may be arranged to pivot about vertical axes.

If desired, where only a single set of compression members are provided, and a single set of second feed members, these may be arranged one at the top of the feed path and one at the bottom, or one at one side of the feed path and one at the other side. For example, a single set of compression members may be provided to pivot upwardly through the bottom of the compression chamber, whilst a single set of second feed members may be provided to pivot downwardly through the top of the feed path.

Although in the first example the compression members are each brought into the compression region and hence into their operative condition solely as a result of pivotal movement, if desired the position of the axis of pivot and/or the extent of pivotal movement may be modified so that only part of the crop engaging rearward surface of the compression members passes beyond the rearwardly facing surface of the second feed members so that the compression members are only brought partly into the compression region by said pivotal movement, or the position of pivot and extent of pivot of the compression members may be such that no part of the rearward surface of the compression members passes rearwardly of the rear surface of the second feed members as a result of pivotal movement of the compression members.

In both cases the compression members would be moved into the compression region and hence into their operative condition by subsequent longitudinal movement thereof by means of the main bale compressing rams described in the second embodiment. Conversely in the second embodiment the configuration may be such that the compression members are brought into the compression region solely as a result of pivotal movement. It is also possible that longitudinal movement of the compression members due to the main bale compressing rams could be initiated prior to completion of inward pivotal movement of the compression members, although it is envisaged that a sensing means would be provided to ensure that the compression members are pivoted inwardly to a predetermined position before any movement of the main bale compressing rams starts and that the compression members move to their fully inward position before the main bale compressing rams have moved the compression members longitudinally a predetermined distance.

The compression members may be moved laterally inwardly into said path by movement other than pivotal, for example as a result of rectilinear movement in a direction perpendicular to the longitudinal axis of the compression chamber. In this case, of course, a final stage of movement of the compression members into the compression region and hence into their operative position would be as a result of longitudinal movement thereof due to operation of the main bale compressing rams.

In both of the examples described with reference to the accompanying drawings and in the modifications described above, the or each compression member is moved into its operative position along a track at least part of which is disposed forwardly of, and spaced from, the forward end of crop which has been transported into the compression chamber by the transport means and so that the compression member passes into said path rearwardly of, and spaced from, a further crop to be transported into the compression chamber by the transport means.

In all versions suitable slots are provided in the side or top and/or bottom walls of the compression chamber to permit passage of the compression members.

Hoops or other members may be provided on the floor of the rear of the compression chamber in which the bale is formed to help to maintain crop at the top of the chamber during compression and so avoid forming a bale with a hollow in its upper surface.

In the above examples the drive to the various components, i.e. pick-up rotor, first and second feed means, (transverse movement and compression movement) and bale tying device, is by way of sprockets and chains and associated bevel gear boxes; if desired any other form of drive means may be provided, for example other forms of mechanical drive or hydraulic drive or combinations of hydraulic and mechanical drive. The compression members, although moved hydraulically, transversely and longitudinally for compression may be moved by any other desired means.

Although in the above examples the baler is arranged to be towed behind a tractor or other vehicle, if desired the baler may be modified so as to be provided with further ground-engageable wheels adjacent the front of the baler and provided with a prime mover so that the baler may be self-propelled.

Although in the above examples the crop is fed by the first feed means along a path which is inclined upwardly at angles of approximately 30° and 15°, in the first and second embodiments respectively, if desired this part of the path may be inclined at other angles to the horizontal and may be itself horizontal where the pick-up itself attains sufficient height of crop and/or where the body is constructed so that the compression chamber is disposed relatively lower than in the example described above, compared with the height to which crop is lifted by the pick-up.

It will be appreciated that in the present examples the crop path is substantially uni-directional and in particular does not involve changes in the direction of flow of the material of any significant extent, compared for example to known balers where crop is turned through substantially a right angle or greater angles during its passage through the baler. It should be noted that the crop is fed into the compression chamber in a direction parallel with the longitudinal axis of the compression chamber although, of course, in modifications the crop could be fed into the compression chamber at an angle inclined to the longitudinal axis but not to any significant extent compared, for example, with known bales where the crop is entered into the compression chamber through the top and bottom thereof and hence at 90° to the longitudinal axis.

I claim:

1. An agricultural baler comprising an elongate body, the body having; support means to permit of the baler being advanced over the ground, a pick-up carried by a part of the body to pick up crop from the ground, an elongate compression chamber disposed rearwardly of the pick-up, transport means carried by a part of the body to transport crop along a path in a direction which lies at least substantially parallel to a vertical plane containing the longitudinal axis of the compression chamber, rearwardly from the pick-up and into the compression chamber in an amorphous mass, a compression member movable into an operative position in which the compression member is disposed within the compression chamber, and movable rearwardly when in said operative position to compress crop against a stop to form the amorphous mass into a bale having a defined shape; and movable into an inoperative position, in which the compression member is disposed outside the compression chamber, and movable forwardly when in said inoperative position to return the compression meber to the front of the compression chamber, the part of the body which carries the pick-up, the part of the body which carries the transport means and the compression chamber being rigidly interconnected, and the transport means being disposed rearwardly of the pick-up and the compression chamber being disposed rearwardly of the transport means wherein the transport means feeds crop rearwardly in batches which are spaced apart longitudinally of said path and means are provided to move the compression member into said operative position along a track at least part of which is disposed forwardly of, and spaced from, the forward end of a batch of crop which has been transported into the compression chamber by the transport means and so that the compression member passes into said path rearwardly of, and spaced from, a further batch of crop to be transported into the compression chamber by the transport means.

2. A baler according to claim 1 wherein the transport means feeds further crop into the compression chamber whilst the compression member is compressing crop already fed into the compression chamber by the transport means.

3. A baler according to claim 1 wherein the compression member is moved into said operative position by being moved laterally inwardly towards the longitudinal axis of the compression chamber and by being moved longitudinally rearwardly.

4. A baler according to claim 3 wherein the compression member is moved laterally inwardly forwardly of a part of the transport means which is engaged with the crop in the compression chamber.

5. A baler according to claim 3 wherein the compression member is moved so as to have a compound motion having a component of motion longitudinally of the compression chamber simultaneously with a component of motion transversely thereof.

6. A baler according to claim 5 wherein the component of motion longitudinally of the compression chamber brings the compression member at least partially into the compression chamber and hence at least partially to said operative position.

7. A baler according to caim 5 wherein the compression member is brought into the compression chamber and hence into the operative position by movement of the compression member in the same direction as the member takes during said movement rearwardly in said operative position to compress the crop.

8. A baler according to claim 5 wherein the compression member is mounted for pivotal movement about an axis transverse to the longitudinal axis of the compression chamber whereby rotation of the compression member about said axis causes said compound motion.

9. A baler according to claim 8 wherein the compression member is mounted for movement longitudinally of the longitudinal axis of the compression chamber independently of said pivotal movement to move the compression member from adjacent the front to adjacent the rear of the compression chamber.

10. A baler according to claim 1 wherein the transport means comprises a first feed means to feed a batch of crop rearwardly from the pick-up to a second feed means which feeds said batch of crop further rearwardly and into the compression chamber.

11. A baler according to claim 10 wherein said part of the track of movement of the compression member is disposed at a location forwardly of, and spaced from, a batch of crop which has been fed rearwardly into the compression chamber by the second feed means and rearwardly of, and spaced from, a further batch of crop which is to be fed rearwardly by the first feed means.

12. A baler according to claim 11 wherein means are provided temporarily to interrupt feed of crop by the transport means whilst the compression member is moved to said operative position and, if desired, during a first part of said movement of the transport means longitudinally of the compression chamber.

13. A baler according to claim 11 wherein the first feed means comprises a first crop feed member movable in a closed path to perform a feed movement in which crop is fed rearwardly, and a return movement in which the first feed member is moved forwardly out of engagement with the crop.

14. A baler according to claim 11 wherein the second feed means comprises at least one second feed member mounted for reciprocatory pivotal movement about an axis, so that a crop-engaging part thereof engages the crop fed rearwardly by the first feed means and advances the crop rearwardly into the compression chamber and is then returned along the same path before the first feed means feeds further crop rearwardly.

* * * * *